United States Patent [19]
DeLuca

[11] Patent Number: 5,930,307
[45] Date of Patent: Jul. 27, 1999

[54] METHOD AND APPARATUS FOR ACQUIRING PEAK AND VALLEY VALUES OF A SIGNAL RECEIVED BY A RADIO COMMUNICATION DEVICE

[75] Inventor: Michael J. DeLuca, Boca Raton, Fla.

[73] Assignee: Motorola, Schaumburg

[21] Appl. No.: 08/583,918

[22] Filed: Jan. 11, 1996

[51] Int. Cl.[6] .................................................. H04L 27/06
[52] U.S. Cl. ........................................ 375/340; 375/317
[58] Field of Search ..................................... 375/340, 317, 375/324; 455/296, 334, 226.1, 231, 230; 340/825.44; 327/58, 62, 72, 73

[56] References Cited

U.S. PATENT DOCUMENTS

| | | | |
|---|---|---|---|
| 4,631,737 | 12/1986 | Davis et al. ................................ | 375/88 |
| 5,303,416 | 4/1994 | Morera .................................... | 455/296 |
| 5,311,554 | 5/1994 | Morera et al. ............................ | 375/75 |
| 5,394,441 | 2/1995 | Morera et al. ............................ | 375/327 |
| 5,566,213 | 10/1996 | Carsello .................................. | 375/340 |
| 5,627,860 | 5/1997 | McKinny et al. ....................... | 375/317 |

*Primary Examiner*—Stephen Chin
*Assistant Examiner*—Betsy L. Deppe
*Attorney, Agent, or Firm*—Pablo Meles

[57] ABSTRACT

A radio communication device (100) for tracking peaks and valleys of a signal received by a receiver (110) includes tracking circuitry (115) for approximating the peaks and valleys by attacking and decaying values stored in peak and valley counters (124, 132). When the tracking circuitry (115) is in a fast track mode, a peak/valley controller (120) decays a stored value by a first amount when the stored value exceeds a sampled signal voltage and attacks the stored value by a second amount when the stored value does not exceed the sampled signal voltage. The first amount is greater than the second amount. Preferably, the counters (124, 132) are eight-bit counters, the first amount equals eight, and the second amount equals four.

19 Claims, 4 Drawing Sheets

METHOD AND APPARATUS FOR ACQUIRING PEAK AND VALLEY VALUES OF A SIGNAL RECEIVED BY A RADIO COMMUNICATION DEVICE

FIELD OF THE INVENTION

This invention relates in general to communication devices, and more specifically to peak and valley acquisition for a signal received by a radio communication device.

BACKGROUND OF THE INVENTION

Communication devices, such as pagers, typically receive and decode radio frequency (RF) signals to recover information contained therein. In many conventional communication devices, a received signal is first converted from the radio frequency at which it is received to baseband, subsequent to which digital data is recovered from the signal. The data is then processed by decoding circuitry, such as a microcomputer or decoder chip, which decodes the included information.

In order to recover the digital data from an incoming signal which includes data symbols, tracking circuitry included within the communication device generally tracks the incoming signal for a predetermined amount of time to acquire peak and valley values, i.e., high and low voltage values, of the signal. During the time in which the signal is tracked, the signal is usually sampled a predetermined number of times per data symbol. Once the incoming signal has stabilized and the peak and valley values have been acquired, the values are stored, and the stored value or values are provided to a threshold detector for computation of voltage thresholds. The threshold detector utilizes the peak and valley values and the thresholds to generate from the incoming signal a stream of digital data for provision to decoding circuitry.

Conventionally, peak and valley values are initialized to predetermined values, such as to values corresponding to ground and the operating voltage. This assures that the tracking circuitry will lock onto the appropriate signal voltages within a given amount of time. However, the initialized peak and valley values often are far removed from actual signal peaks and valleys, requiring a relatively long time for peak and valley acquisition, which can result in missed information.

During peak and valley acquisition, conventional communication receivers also usually modify counters by a single count of the least significant bit when the sampled signal exceeds either a peak or a valley to assure minimum granularity. Modification by a single count of the least significant bit, however, further slows peak and valley acquisition time.

Thus what is needed is a method and apparatus for more rapidly acquiring peak and valley values of a signal received by a communication device.

DESCRIPTION OF A PREFERRED EMBODIMENT

Figure 1:
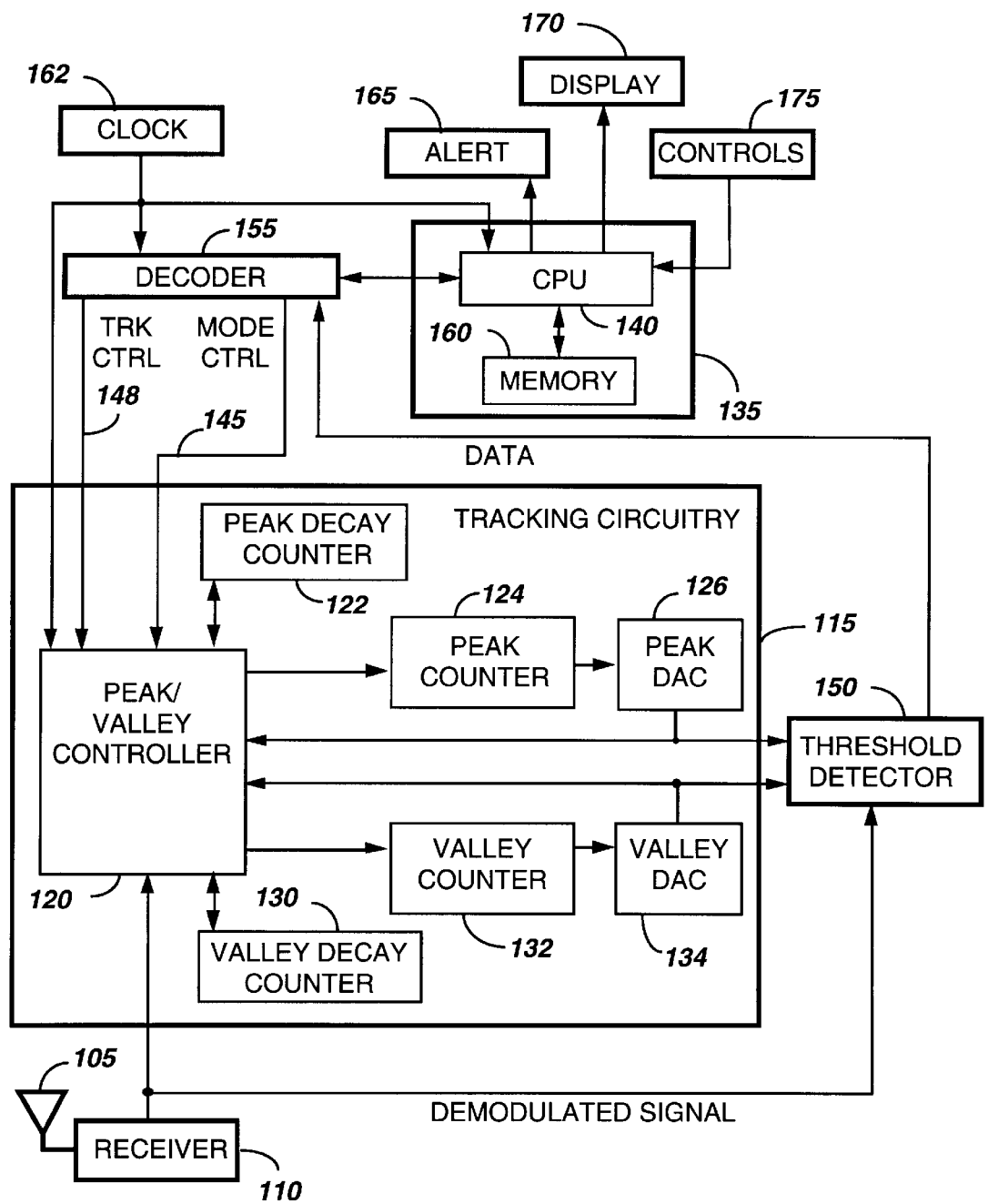
FIG. 1 is an electrical block diagram of a radio communication device including tracking circuitry for tracking peaks and valleys of a received signal according to the present invention.

With reference to FIG. 1, an electrical block diagram of a radio communication device 100 is depicted. In accordance with the present invention, the communication device 100 comprises an antenna 105 for receiving a radio frequency (RF) signal and a receiver 110 coupled to the antenna 105 for demodulating the RF signal. The demodulated signal is thereafter provided to tracking circuitry 115 for processing the signal to acquire peaks and valleys, i.e., highs and lows, of the signal for subsequent use in generating digital data. The tracking circuitry 115 preferably comprises a peak/valley controller 120 and eight-bit peak and valley counters 124, 132 coupled to the controller 120 for storing values corresponding to the signal peaks and valleys as directed by the controller 120. Additionally, digital-to-analog converters (DACs) 126, 134 are respectively coupled to the peak and valley counters 124, 132 for converting the digital outputs of the counters 124, 132 to analog values. A peak decay counter 122 and a valley decay counter 130 are coupled to the controller 120 for counting the number of signal samples that do not result in attack of the signal by incrementation of the peak counter 124 and decrementation of the valley counter 132. This is preferably done by storing time values that measure predetermined times responsive to which decays occur.

Further included in the communication device 100 is a processing unit for controlling the operation of the radio communication device 100. Preferably, the processing unit is a microcomputer 135, such as the MC68HC11 manufactured by Motorola, Inc. of Schaumburg, Ill. It will be appreciated that the processing unit may be alternatively implemented through the use of hard-wired logic capable of performing the same operations.

The microcomputer 135 includes a central processing unit (CPU) 140, which controls the microcomputer 135, and a memory 160 for storing subroutines executed by the CPU 140 during operation of the data communication receiver 100. A decoder 155 is coupled to the microcomputer 135 for decoding demodulated data. The decoder 155 is preferably implemented through use of the Motorola, Inc. model number MC68175 FLEX™ integrated circuit, although it will be appreciated that other implementations capable of performing equivalent operations can alternatively be used. A processor provides control signals to the peak/valley controller 120 via a mode control line 145 and a track control line 148. Preferably, the processor comprises the decoder 155, although other devices could alternatively be used for providing control signals to the peak/valley controller 120.

Preferably, the decoder 155 can disable the tracking circuitry 115 by setting the tracking circuitry 115 in a "hold" or "off" mode and can place the tracking circuitry 115 in "fast track" or "slow track" modes in which a stored value set in one of the peak and valley counters 124, 132 is decayed and attacked. Additionally, the decoder 155 can inhibit tracking via the track control line 148. In both fast and slow track modes, the incoming demodulated signal is tracked to acquire the peaks and valleys of the signal. As the signal is tracked, the peak and valley counters 124, 132 are incremented and decremented to store values representing the signal levels, i.e., the peaks and valleys of the signal.

During the fast track mode, which preferably occurs each time the receiver 110 is enabled, the decay rate of the tracking circuitry 115 is greater than the attack rate. In other words, during peak acquisition, the amount by which the peak counter 124 is decremented towards a central value is greater than the amount by which the peak counter 124 is incremented away from the central value. During valley acquisition, the amount by which the valley counter 132 is incremented towards the central value is greater than the amount by which the valley counter 132 is decremented away from the central value. Preferably, the decay rate is twice that of the attack rate, although the relationship between the two rates could be different in alternate embodiments of the present invention. Fast track therefore provides a mode in which peak and valley values can be very rapidly acquired without ever having to initialize the counters 124, 132.

In the prior art devices, on the other hand, peak and valley counters are commonly initialized to their minimum and maximum values, respectively. Furthermore, the attack and decay rates are generally equivalent. As a result, the amount of time required for peak and valley acquisition is increased and can be relatively slow.

In other prior art devices, peak and valley tracking is implemented using a fast sampling eight-bit analog-to-digital circuit and registers for storing peak and valleys according to general algorithms. However, the analog-to-digital circuits require significantly higher clock rates to converge on the sampled values than does the tracking circuitry 115 according to the present invention. Therefore, the tracking circuitry 115, which runs at a reduced clock rate, advantageously draws less power for an increased battery life. Furthermore, the tracking circuitry 115 is less complex and includes a lesser amount of circuitry, which conveniently decreases the size and price of the radio communication device 100 according to the present invention.

U.S. Pat. No. 4,631,737 to Davis et al. and U.S. Pat. No. 5,311,554 to Morera et al. provide detailed descriptions of the prior art. Both of these patents are assigned to the assignee hereof and are hereby incorporated by reference.

In the slow track mode according to the present invention, the amount by which the peak and valley counters 124, 132 are incremented and decremented, respectively, to attack the received signal is greater than the amount by which the peak and valley counters 124, 132 are decremented and incremented, respectively, to decay. Preferably, the counters 124, 132 are modified by two during attack and by one during decay. Therefore, peaks and valleys of the signal can be acquired much more rapidly than in conventional devices, which attack using an increment of one. According to the present invention, however, each attack that results in an overshoot of the signal is followed by a decay of one. In this manner, a fine resolution is advantageously maintained without requiring slow acquisition rates.

The radio communication device 100 further includes a threshold detector 150 for generating one or more thresholds of the signal. For example, in a two-level signalling system, the threshold detector 150 generates a center threshold of the signal from the peak and valley values. Signal levels of the demodulated signal which are above the center threshold are recognized as being digital ones, and signals levels which are below the center threshold are recognized as being digital zeros. The threshold detector 150 utilizes the peak and valley values and the demodulated signal to generate digital data, which is provided to the decoder 155.

In a four-level signalling system, such as that of a system utilizing the FLEX™ paging protocol, the threshold detector 150 uses center, high, and low thresholds to digitize four-level data symbols. A signal level of the demodulated signal which is above the high threshold is recognized as the digital value "11", while a signal level lower than the low threshold is recognized as the digital value "00". A signal level between the center and high thresholds is recognized as "10", and a signal level between the center and low thresholds is recognized as "01".

The data generated by the threshold detector 150 is then provided to the decoder 155, which decodes the data to recover information, e.g., selective call messages. Once the decoder 155 indicates that a message has been received, the CPU 140 can provide an activation signal to an alert mechanism 165, such as a transducer, which, in response to the signal, generates an audible alert to announce to a user that a selective call message has been received. The selective call message may be displayed to the user on a display device 170 either automatically or manually in response to user manipulation of controls 175, which are accessible from the exterior of the radio communication device 100.

A clock 162 is included in the communication device 100 and coupled to the CPU 140, the decoder 155, and the peak/valley controller 120 for providing time values thereto. The peak/valley controller 120 uses the time values for sampling the signal at periodic times of less duration than the bit time. Preferably, the signal is periodically sampled 38,400 times per second.

The receiver 110 preferably is enabled and disabled for signal reception in a conventional manner. After the microcomputer 135 has enabled the receiver 110 and time has been allowed for circuitry stabilization, the decoder 155 places the tracking circuitry 115 in fast track mode for a first predetermined time. After expiration of the first predetermined time, the decoder 155 places the tracking circuitry 115 in slow track mode for a second predetermined time. Thereafter, the thresholds generated from the peak and valley values are valid and processing of the data can begin. Assuming a stable and valid demodulated signal, the first and second predetermined times are preferably one bit time for fast track and five bit times for slow track, although it will be appreciated that other time periods could alternatively be utilized. Mode control can be accomplished by providing predetermined signals over the mode control line 145. For example, a high signal can be indicative of the fast track mode while a low signal can be indicative of the slow track mode.

Since peak and valleys will have normally been acquired within the aforementioned predetermined times, the slow track mode can then be inhibited, such as by providing a high signal on the track control line 148. In the "hold" mode, tracking is continuously disabled for a period of time so that the existing peak and valley values are used by the threshold detector 150. In the "inhibited track" mode, tracking is preferably inhibited 75% of the time synchronous to the center of the received symbols. More specifically, during slow track mode, the signal is generally sampled for a predetermined number of times per symbol, and each sample results in an attack or a potential decay. During the inhibited track mode, samples of the signal are enabled only during a subset of the predetermined number of times so that the signal is sampled and consequently attacked and decayed only during centers of the data symbols. As a result, the decay rate during the inhibited track mode is one-quarter of the decay rate during the slow track mode.

According to the present invention, the tracking circuitry 115 is placed in the fast track mode whenever the receiver 110 is enabled from an "off" state. As a result, each time the receiver 110 comes out of a conventional battery save mode, the peaks and valleys are decayed twice as fast as they are attacked, which quickly brings the peaks and valleys close to their final values while avoiding significant overshoots. The time for peak and valley acquisition is therefore minimized, and the need to initialize or reset the tracking circuitry 115 is eliminated. After time has been allowed for circuitry warm-up so that the demodulated signal has stabilized and after the tracking circuitry 115 has been in fast track mode for the predetermined time, the tracking circuitry 115 is placed in the slow track mode, during which peak and valleys continue to be rapidly acquired while maintaining resolution.

Figure 2:
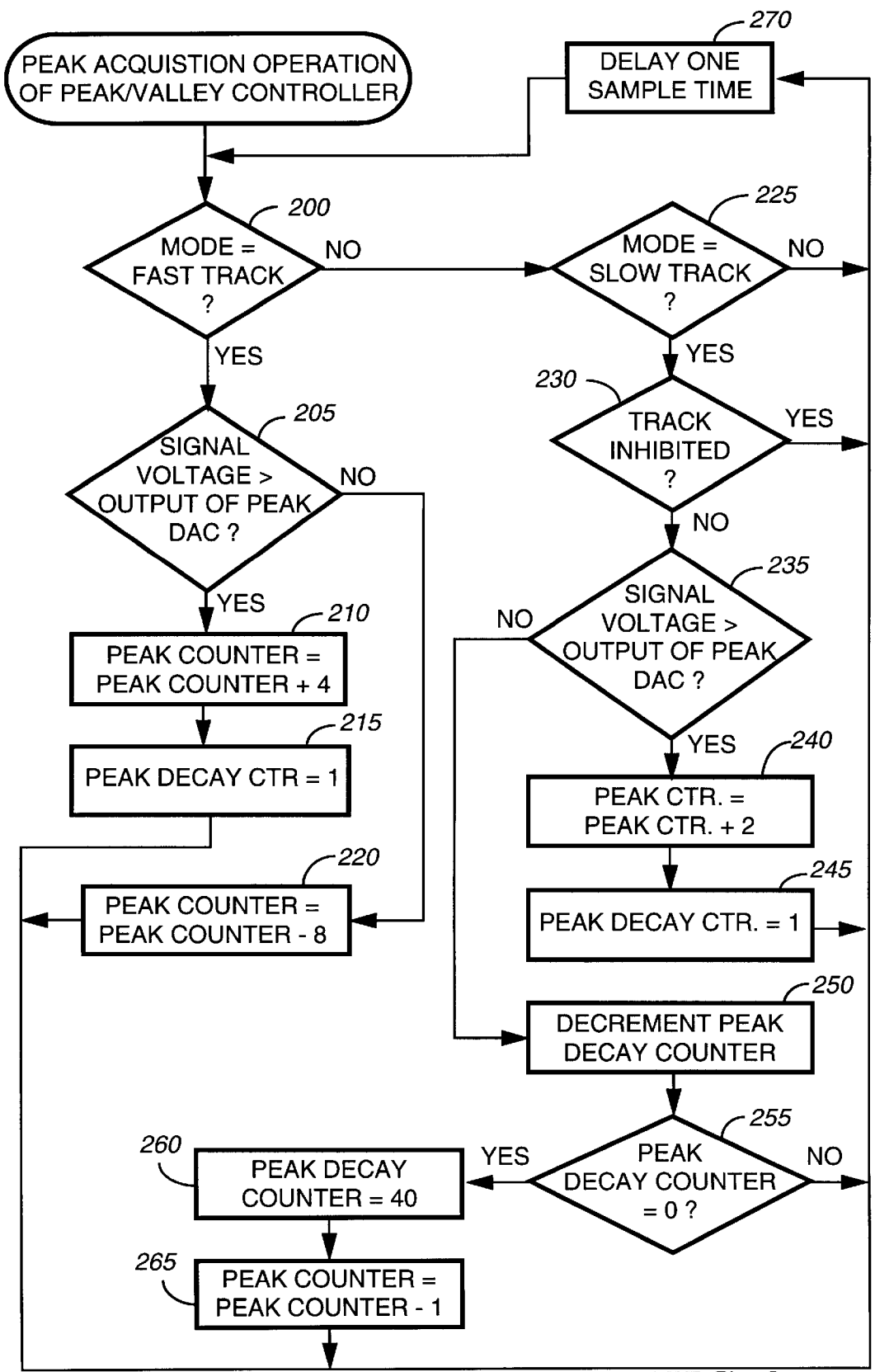
FIG. 2 is a flowchart depicting a peak acquisition operation of the tracking circuitry of FIG. 1 in accordance with the present invention.

Referring next to FIG. 2, a flowchart depicts an operation of the peak/valley controller 120 (FIG. 1) during peak acquisition according to the present invention. At step 200, the controller 120 receives a signal indicative of fast track mode, in response to which the sampled signal voltage is compared to the output of the peak DAC 126. This output corresponds to the stored peak value in the peak counter 124. When, at step 205, the sampled signal voltage is greater than the output of the peak DAC 126, i.e., the output value of the peak DAC 126 does not exceed the sampled signal voltage, the value is attacked by incrementing the peak counter 124 by a first amount, preferably by four, at step 210. Additionally, at step 215, the peak decay counter 122 is set to one. When, at step 205, the sampled signal voltage is not greater than the output of the peak DAC 126, i.e., the peak value exceeds or equals the sampled signal voltage, the peak value is decayed by decrementing the peak counter 124 by a second amount, preferably by eight, at step 220. Processing resumes at step 200 after a delay of one sample time, at step 270. In this manner, the decay is twice as fast as the attack, which provides rapid acquisition of peak values.

After one bit time, the tracking circuitry 115 is placed in slow track mode, at step 225. When track is not inhibited, at step 230, the controller 120 compares, at step 235, the signal voltage to the output of the peak DAC 126. When the peak value does not exceed the sampled signal voltage, i.e., when the sampled signal voltage is greater than the output of the peak DAC 126, the peak value is attacked, at step 240, by incrementing the peak counter 124 by a third amount such as two. Also, the peak decay counter 122, at step 245, is set to a first time value, preferably one. When, on the other hand, the signal voltage is not greater than the output of the peak DAC 126, i.e., when the peak value exceeds the signal voltage, the peak decay counter 122 is decremented by a fourth amount, e.g., one, at step 250. When, at step 255, this results in the value of the peak decay counter 122 being equal to zero, the peak decay counter 122 is set, at step 260, to a second time value that is forty times greater than the first time value. In other words, the second time value preferably equals forty. Next, at step 265, the peak value is decayed by decrementing the peak counter 124 by one. Processing is then delayed for one sample time, at step 270.

At step 230, tracking can be inhibited to place the tracking circuitry 115 in either the "hold" or "inhibited track" mode as mentioned above. The difference in the two modes is that "hold" mode typically endures for a greater amount of time, such as the long battery save intervals of the FLEX™ paging protocol. During this time, the tracking circuitry 115 is essentially turned off. "Inhibited track" mode, on the other hand, endures for only 75% of a symbol time so that "slow track" mode can be resumed at the centers of the data symbols.

In the slow track mode according to the present invention, the signal is attacked by two. When an attack results in overshoot of the signal, it is followed by a decay of one at the next sample time. Thereafter, if no attack occurs for forty samples, a decay of one occurs again. In this manner, the peak can be rapidly acquired. Specifically, the signal is attacked twice as fast as occurs in conventional radio communication devices. At the same time, resolution is advantageously maintained because a decay of one follows each overshoot of the signal.

Figure 3:
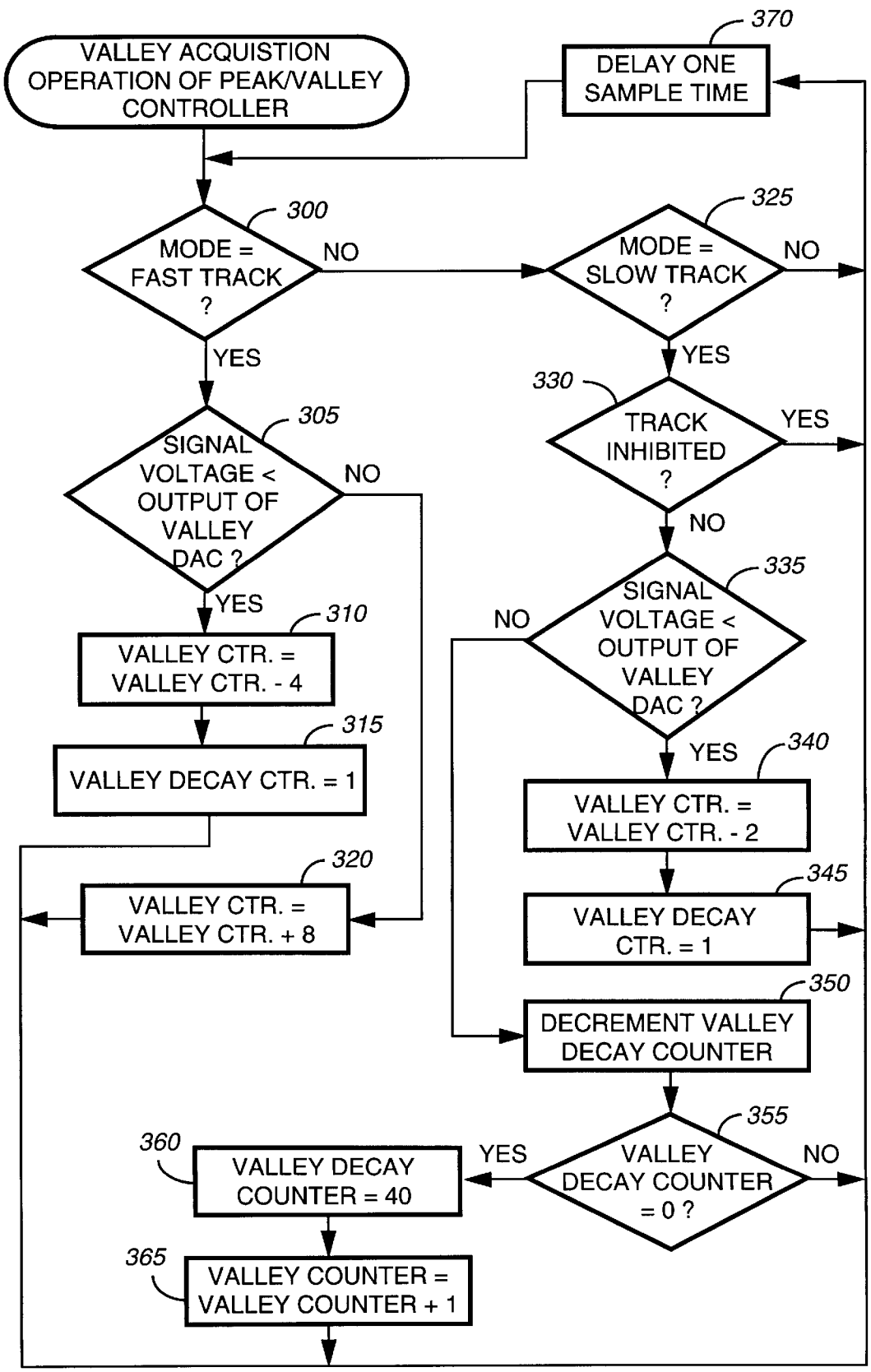
FIG. 3 is a flowchart of a valley acquisition operation of the tracking circuitry of FIG. 1 in accordance with the present invention.

The operation of the peak/valley controller 120 is similar during valley acquisition, although processing occurs in an inverse manner in some respects. A flowchart of valley acquisition is depicted in FIG. 3. When, at step 300, the tracking circuitry 115 is placed in the fast track mode, the sampled signal voltage is compared, at step 305, to the output of the valley DAC 134 (FIG. 1). This output is indicative of the stored valley value set in the valley counter 132. When the value at the output of the valley DAC 134 is greater than the sampled signal voltage, i.e., when the value provided by valley DAC 134 does not exceed the sampled signal voltage, the value is attacked. This is done, at step 310, by decrementing the valley counter 132 by a fixed amount, preferably four. The valley decay counter 130 is also set to one, at step 315. When the value at the output of the valley DAC 134 is not greater than the sampled signal voltage, i.e., when the value exceeds the sampled signal voltage, the valley value is decayed by incrementing the valley counter 132, at step 320, by another fixed amount, such as eight. Therefore, during fast track, decay occurs twice as fast as attack for rapid valley acquisition. After a delay of one sample time, at step 370, processing is resumed at step 300.

To illustrate this point, in the case of acquiring a peak value, the method as shown in FIG. 2 would decay a value by a first amount when the value is greater than or equal to a sampled signal voltage and attack the value by a second amount when the value is less than the sampled signal voltage. Conversely, in the case of acquiring a valley value, the method as shown in FIG. 3 would decay a value by a first amount when the value is less than or equal to a sampled signal voltage and attack the value by a second amount when the value is greater than the sampled signal voltage, wherein the first amount is greater than the second amount in either case.

When, at step 325, the tracking circuitry 115 is placed in the slow track mode and, at step 330, tracking is not inhibited, the signal voltage is compared, at step 335, to the output of the valley DAC 134. When the output of the valley DAC 134 is greater than the sampled signal voltage, i.e., when the output value exceeds the sampled signal voltage, the valley value is attacked by decrementing the valley counter 132, at step 340, by a predetermined number, such as two. The valley decay counter 130 is, at step 345, set to one. When the output of the valley DAC 134 is not greater than the sampled signal voltage, i.e., when the valley value is less than or equal to the sampled signal voltage, the value is attacked by decrementing the valley decay counter 130, at step 350. When the decrementation results in the value of the counter 130 being equal to zero, at step 355, the valley decay counter 130 is set to forty, at step 360. Thereafter, the valley counter 132 is incremented by a predetermined amount, preferably one. This slow track operation ensures attack of the signal by two. When an attack results in a valley value that is outside of the signal range, i.e., when the attack results in an undershoot, a decay of one follows to correct the valley value. As a result, valley acquisition occurs more rapidly than in prior art devices without sacrificing resolution.

Figure 4:
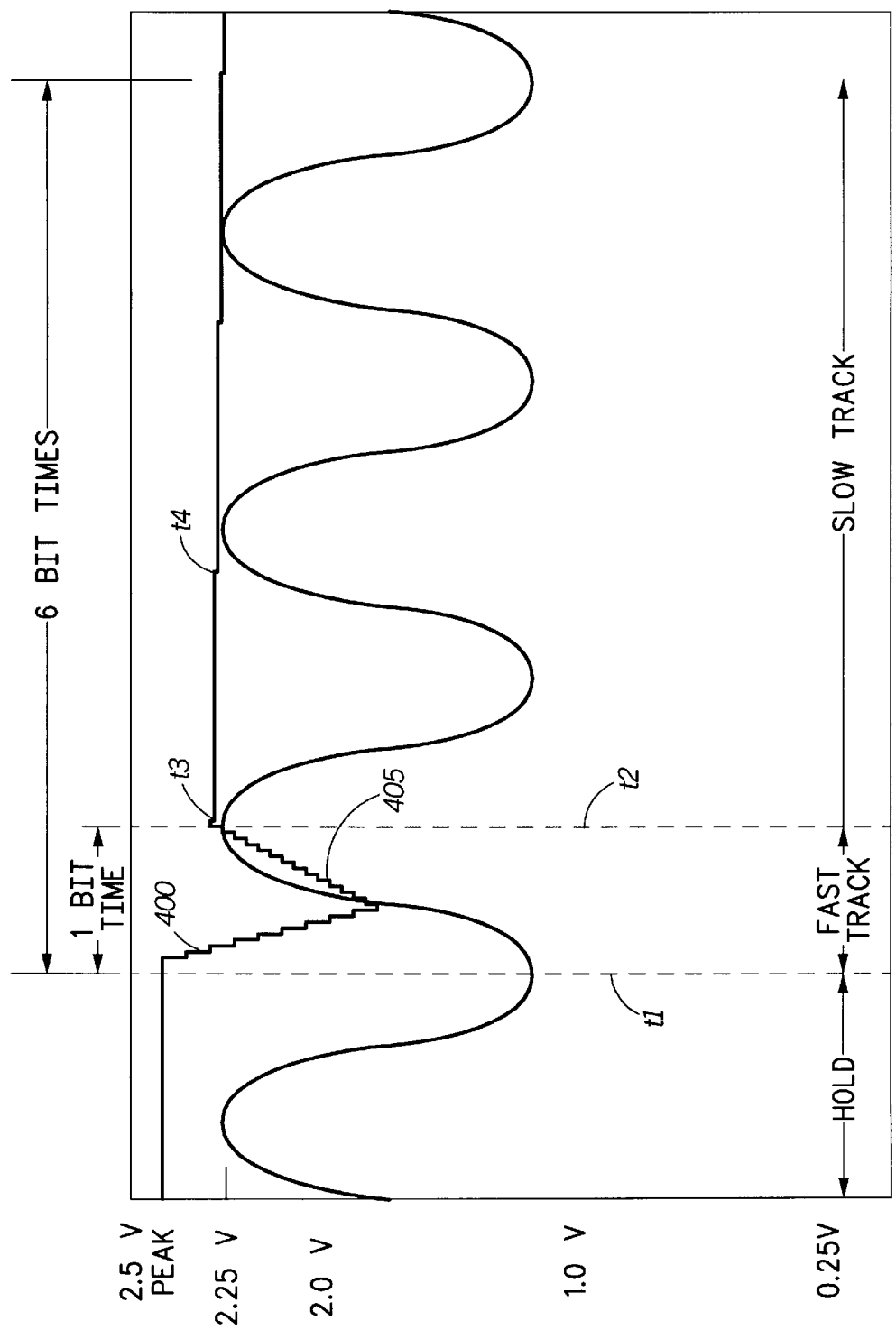
FIG. 4 is a signal diagram illustrating peak acquisition according to the present invention.

FIG. 4 is a signal diagram illustrating peak acquisition by the tracking circuitry 115 according to the present invention. When the receiver 110 (FIG. 1) is enabled and adequate time has passed for generation of a valid demodulated signal, the decoder 155 places the tracking circuitry 115 in fast track mode at $t_1$. During fast track, each decay, one of which is shown as reference number 400, decrements the peak counter 124 by eight. Each attack, one of which is shown as reference number 405, increments the peak counter 124 by four. Because each decay occurs in relatively large steps during fast track mode, it will be appreciated that the tracking circuitry 115 does not need to be reset or initialized during subsequent fast track modes (not shown). Instead, when a subsequent fast track mode is set, the peak value can simply start at whatever value is indicated by values currently stored in the peak counter 124. Furthermore, the value stored in the peak delay counter 122 also does not need to be reset or initialized. In similar manner, the valley counter 132 and the valley decay counter 130 do not require initialization.

Slow track mode is entered at $t_2$, at which time an attack occurs, causing incrementation of the peak counter 124 by two. Thereafter, since the attack resulted in an overshoot of the signal, a decay occurs at the next sample time, $t_3$. The decay decrements the peak counter 124 by one to maintain a fine resolution. During the next sample time, no attack occurs because the peak value is still greater than the signal voltage. When no attack has occurred for forty sample times, the peak value is again decayed by one, at $t_4$.

In summary, the radio communication device as described above includes tracking circuitry that can operate in both fast track and slow track modes. In fast track mode, the decay rate is twice as fast as the attack rate, ensuring rapid peak and valley acquisition. In slow track mode, the tracking circuitry attacks by two to continue rapid peak and valley acquisition. However, each attack that results in a signal overshoot is followed by a decay of one. In this manner, the tracking circuitry according to the present invention attacks twice as fast as conventional tracking circuitry when in the slow track mode. Resolution of the peak and valley values is not compromised, though, because the decay that immediately follows any overshoot corrects the peak and valley values to provide the desirable resolution.

Furthermore, prior art peak and valley counter circuits which begin acquisition with a reset and attack at one count per sample would require approximately fifteen bit times to acquire valid peak and valley values. The present invention can acquire valid peak and valley values in six bit times or less. This allows a significant reduction in the overall start up time of the data communication receiver according to the present invention.

According to the present invention, tracking can also be inhibited during the slow track mode to provide an "inhibited track" mode. In this mode, tracking is generally inhibited for 75% of each data symbol and enabled for 25% of each data symbol, although this allocation can be varied. Preferably, tracking is enabled during centers of the symbols to ensure accurate sampling of the signal. This mode, which can be entered after the six bit time sequence of FIG. 4 and while data is being processed, has the advantage of increasing the decay rate by four such that the peaks and valleys are decayed every one-hundred-sixty (160) samples. This enables holding of peak and valley values through long sequences of "ones" or "zeros" while also providing for a quick decay from signal overshoots, such as that depicted in FIG. 4 in which tracking is enabled 100% of the time.

It will be appreciated by now that there has been provided a method and apparatus for rapidly acquiring peak and valley values of a received signal while maintaining a fine resolution.

What is claimed is:

1. A method for tracking peaks and valleys of a signal received by a radio communication device including peak and valley counters for storing values that are decayed and attacked to acquire peak and valley values, the method comprising the steps of:
    entering a fast track mode in response to enabling a receiver to receive the signal, the fast track mode characterized by the steps of:
        in the case of acquiring a peak value decaying the peak value by a first amount when the peak value is greater than or equal to a sampled signal voltage and attacking the peak value by a second amount when the peak value is less than the sampled signal voltage; and
        in the case of acquiring a valley value, decaying a valley value by the first amount when the valley value is less than or equal to the sampled signal voltage and attacking the valley value by the second amount when the valley value is greater than the sampled signal voltage wherein the first amount is greater than the second amount in either case.

2. The method of claim 1, wherein the first amount is twice the second amount.

3. The method of claim 1, wherein the peak and valley counters are eight-bit counters, and wherein:
    the decaying step comprises the steps of:
        decrementing the peak counter by eight; and
        incrementing the valley counter by eight; and
    the attacking step comprises the steps of:
        incrementing the peak counter by four; and
        decrementing the valley counter by four.

4. The method of claim 1, further comprising the steps of:
    entering a slow track mode subsequent to the fast track mode, the slow track mode characterized by the steps of:
        attacking the peak value by a third amount when the peak value is less than the sampled signal voltage; and
        selectively decaying the peak value by a fourth amount when the peak value is greater than or equal to the sampled signal voltage.

5. The method of claim 4, wherein the third amount is twice the fourth amount, and wherein the first amount is twice the third amount.

6. The method of claim 4, wherein the step of decaying the peak value by the fourth amount further occurs in response to determining that one sample time has passed since the peak value was attacked by the third amount.

7. The method of claim 4, wherein the step of decaying the peak value by the fourth amount further occurs in response to determining that a predetermined number of sample times has passed.

8. A radio communication device for tracking peaks and valleys of a signal received by a receiver, the radio communication device comprising:
    tracking circuitry coupled to the receiver for tracking the peaks and valleys; and
    a processor coupled to the tracking circuitry for placing the tracking circuitry in a fast track mode in response to enabling the receiver;
    wherein the tracking circuitry comprises:
        peak and valley counters for storing values that are attacked and decayed to approximate the peaks and valleys; and
        a controller coupled to the peak and valley counters which in the case of acquiring a peak value allows for decaying a first value by a first amount when the first value is greater than or equal to a sampled signal voltage and attacking the first value by a second amount when the first value is less than the sampled signal voltage, wherein in the case of acquiring a valley value the controller decays a second value by the first amount when the second value is less than or equal to a sampled signal voltage and attacks the second value by the second amount when the second value is greater than the sampled signal voltage, wherein the first amount is greater than the second amount in either case.

9. The radio communication device of claim 8, wherein the first amount is twice the second amount.

10. The radio communication device of claim 8, wherein the peak and valley counters are eight-bit counters, and wherein the first amount equals eight and the second amount equals four.

11. The radio communication device of claim 8, wherein the processor includes means for placing the tracking circuitry in a slow track mode subsequent to the fast track mode, during which the controller attacks the first value by a third amount when the first value is less than the sampled signal voltage and selectively decays the first value by a fourth amount when the first value is greater than or equal to the sampled signal voltage.

12. The radio communication device of claim 11, wherein the third amount is twice the fourth amount, and wherein the first amount is twice the third amount.

13. The radio communication device of claim 11, wherein the controller includes means for determining that one sample time has passed since the first value was attacked by the third amount and for decaying the value by the fourth amount responsive thereto.

14. The radio communication device of claim 11, wherein the tracking circuitry includes a decay counter for determining that a predetermined number of sample times has passed since the first value was attacked by the third amount, and wherein the value is decayed by the fourth amount in response to determining that the predetermined number of sample times has passed.

15. A radio communication device for tracking peaks and valleys of a signal received by a receiver, the radio communication device comprising:
   tracking circuitry coupled to the receiver for tracking the peaks and valleys; and
   a processing unit coupled to the tracking circuitry for placing the tracking circuitry in a slow track mode in response to enabling the receiver;
   wherein the tracking circuitry comprises:
      peak and valley counters for storing values that are attacked and decayed to approximate the peaks and valleys;
      a decay counter for storing a time value, wherein the decay counter is set to a first time value after an attack and to a second time value greater than the first time value after a decay; and
      a controller coupled to the peak and valley counters and the decay counter for attacking a stored value set in the peak and valley counters by a first amount when the stored value does not exceed a sampled signal voltage and for decaying the stored value by a second amount less than the first amount when the time value is indicative of a predetermined number of sample times.

16. The radio communication device of claim 15, wherein the first amount is twice the second amount.

17. The radio communication device of claim 15, wherein the peak and valley counters are eight-bit counters, wherein the first amount equals two, and wherein the second amount equals one.

18. The radio communication device of claim 15, wherein the second time value is forty times greater than the first time value.

19. A radio communication device for tracking peaks and valleys of a signal received by a receiver, the signal including data symbols, the radio communication device comprising:
   tracking circuitry coupled to the receiver for sampling the signal a predetermined number of times per data symbol and for attacking and decaying a stored value to track the peaks and valleys; and
   a processing unit coupled to the tracking circuitry for placing the tracking circuitry in a slow track mode during which a stored value is attacked or decayed each sample time of the predetermined number of times and for placing the tracking circuitry in an inhibited track mode during which the stored value is decayed only during a subset of the predetermined number of times, the subset corresponding to centers of the data symbols.

* * * * *